(12) United States Patent
Yasui et al.

(10) Patent No.: US 6,731,332 B1
(45) Date of Patent: May 4, 2004

(54) IMAGE PROCESSING APPARATUS

(75) Inventors: Nobuhiko Yasui, Moriguchi (JP); Atsushi Iisaka, Takatsuki (JP); Noboru Nomura, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/238,611

(22) Filed: Jan. 28, 1999

(30) Foreign Application Priority Data

Jan. 29, 1998 (JP) .......................................... 10-016889

(51) Int. Cl.$^7$ .............................. H04N 7/18; H04N 9/47
(52) U.S. Cl. ........................................ 348/148; 348/149
(58) Field of Search .................................. 348/148, 149

(56) References Cited

U.S. PATENT DOCUMENTS

| | | | | |
|---|---|---|---|---|
| 4,807,027 A | * | 2/1989 | Muto | 348/148 |
| 5,619,587 A | * | 4/1997 | Willoughby, Jr. et al. | 382/141 |
| 5,689,442 A | * | 11/1997 | Swanson et al. | 380/241 |
| 5,790,403 A | * | 8/1998 | Nakayama | 701/28 |
| 5,806,019 A | * | 9/1998 | Ishiyama | 701/300 |
| 6,191,704 B1 | * | 2/2001 | Takenaga et al. | 340/903 |
| RE37,610 E | * | 3/2002 | Tsuchiya et al. | 340/435 |

FOREIGN PATENT DOCUMENTS

| | | |
|---|---|---|
| JP | 8/510349 | 10/1996 |
| WO | WO 94/28527 | 12/1994 |

OTHER PUBLICATIONS

"Recognising groups of curves based on new affine mutual geometric invariants, with applications to recognizing intersecting roads in aerial images" Barzohar, M.; Keren, D.; Cooper, D.B.; Pattern Recognition, 1994. vol. 1—Conference A: Computer Vision.*

"Recognizing mice, vegetable and hand printed characters based on implicit polynomials, invariants and Bayesian methods" Subrahmonia, J.; Karen, D.; Cooper, D.B.; Computer Vision, 1993. Proceedings., Fourth International Conference on, May 11–14, 1993.*

"Vehicle guidance for an autonomous vehicle" Simon, A.; Becker, J.C.; Intelligent Transportation Systems, 1999 Proceedings 1999 IEEE/IEEJ/JSAI International Conference on, Oct. 5–8, 1999 Pages(s): 429–434.*

"3D B–spline curve matching for model based object recognition" Krebs, B.; Korn, B.; Wahl, F.M.; Image Processing, 1997. Proceedings, International Conference on, Oct. 26–29, 1997 Page(s): 716–719 vol. 2.*

* cited by examiner

Primary Examiner—Andrew Christensen
Assistant Examiner—Eric Wisdahl
(74) Attorney, Agent, or Firm—Wenderoth, Lind & Ponack, L.L.P.

(57) ABSTRACT

In an image processing apparatus carried on a vehicle, an image of a scene around the vehicle, which is photographed by an image pick-up, is inputted into a white line failure extractor. Then, outline points of a white line on a road and a guardrail, which is parallel to the white line, are sought. Further, the outline points are detected as a polynomial. Moreover, the image photographed by the image pick-up is also inputted into an intermittent image obtainer. Then, the images from the image pick-up are intermittently obtained at constant periodical intervals, and further the images are compressed using JPEG compression method. Further, in a synthesizer, the feature data from the white line feature extractor and the image data from the intermittent image obtainer are aligned in order of time. Moreover, the image data and feature data, which are aligned in order of time, are conserved within a given constant period by a recorder. Thus, accurate data as to condition of the road can be recorded using a small capacity memory.

14 Claims, 10 Drawing Sheets

IMAGE PROCESSING APPARATUS

FIELD OF THE INVENTION

The present invention relates to an image processing apparatus, which is carried on a movable body such as a vehicle or the like, for detecting or measuring a situation or the like around the movable body.

DESCRIPTION OF THE PRIOR ART

In recent years, there prevails an image processing apparatus for detecting a feature or situation of an object to be observed. Specifically, for example, an image processing apparatus has been generally known, which is carried on a vehicle, for processing images obtained by photographing a scene outside of the vehicle so as to obtain various information which is useful for driving or moving the vehicle (Hereinafter, the apparatus may be referred to "on-vehicle image processing apparatus".). In the on-vehicle image processing apparatus described above, images, which continuously change wholly as the vehicle moves, are processed so that various feature information, such as a situation of the road and affairs around the road or motion of other vehicles, is extracted.

Further, generally among the image processing apparatus in which any feature portion in the images is extracted, particularly in the image processing apparatus in which the motion of a specified feature portion of the images is also extracted, the motion of the feature portion is extracted by motion compensation of MPEG (Moving Picture Expert Group), for example. Hereupon, the "motion compensation" means such an image processing procedure that divides each of the frames of the photographed images into a plurality of blocks, detects that a specified block (i.e. motion compensation block) including a feature portion in a certain frame is similar to another block in the preceding frame according to a value of correlation in a defined search area. Further, the motion of the feature portion among the frames is detected by detecting displacement of the center of gravity of the block in the search area (For example, see the magazine of "Electronics", March, 1996.).

Further, a specific example of a, conventional image processing apparatus for detecting motion of a movable body is disclosed, for example, in the Japanese Laid-open Patent Publication No. 6-337938.

Figure 16:
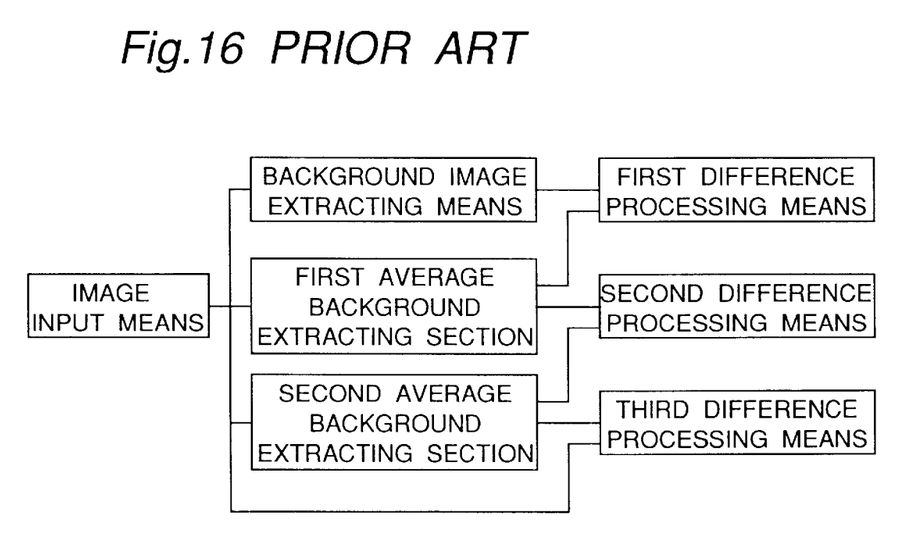
FIG. 16 is a block diagram showing the construction of a conventional image processing apparatus.

As shown in FIG. 16, the image processing apparatus disclosed in the Japanese Laid-open Patent Publication No. 6-337938 is provided with (a) image input means for inputting images including objects and their background, (b) background image extracting means for holding and outputting the background, (c) first average background extracting means for extracting the images including stationary objects, moving objects which are moving below the first velocity, and the background, (d) second average background extracting means for extracting the images including stationary objects, moving objects which are moving below the second velocity, and the background, (e) first difference processing means for seeking the difference between the output of the background image extracting means and the output of the first average background extracting means so as to generate velocity images on the basis of the difference, (f) second difference processing means for seeking the difference between the outputs of the both average background extracting means so as to generate velocity images on the basis of the difference, (g) third difference processing means for seeking the difference between the output of the image input means and the output of the second average background extracting means so as to generate velocity images on the basis of the difference.

However, in the conventional image processing apparatus utilizing the motion compensation of the MPEG described above, there is such a problem that although is is possible to detect the motion of the moving object within the block obtained by dividing the frame, it is impossible to extract the moving object from all the images.

Meanwhile, in the conventional image processing apparatus disclosed in the Japanese Laid-open Patent Publication No. 6-337938, there is such a problem that although it is possible to extract the moving object when the background is fixed, it is impossible to extract the moving object when the background changes as in the case of a on-vehicle image processing apparatus. That is, in the case that the conventional image processing apparatus is carried on the vehicle, because the shape of the background images in front of the vehicle continuously changes, it is impossible to exactly extract the motion of the background so that it is impossible to extract an obstruction or the like which is approaching the present vehicle, for example.

Moreover, in the conventional on-vehicle image processing apparatus in which the background images continuously change, there is such a problem that because it is required to process a huge amount of image data, the construction of the image processing apparatus is large-sized or complicated.

SUMMARY OF THE INVENTION

The present invention has been developed to solve the conventional problems described above, and has an object of providing an image processing apparatus of simple construction carried on a movable body such as a vehicle, which can extract the moving object or the like from the images over the whole images, even if the background continuously changes.

According to a first aspect of the present invention which is achieved to solve the above-mentioned problems, there is provided (i) an image processing apparatus carried on a movable body (apparatus which can move, for example, vehicle such as automobile etc.), which includes (ii) an image pick-up means for continuously photographing a scene (for example, road and its circumstance etc.) outside of the movable body to continuously form an image (pick-up image) corresponding to the scene, (iii) a feature extracting means for processing the image formed by the image pick-up means to continuously extract a predetermined feature (feature information) in the scene (iv) a transmitting means for transmitting the feature extracted by the feature extracting means to an external device, and (v) a recording means for recording therein the feature extracted by the feature extracting means.

According to the image processing apparatus, even if the background scene continuously changes, the feature information such as a moving object can be extracted from all the images. Moreover, because the extracted feature information can be transmitted to the outer device and recorded, the feature information can be utilized for driving or moving the movable body.

In the image processing apparatus according to the first aspect of the present invention, it is preferable that the apparatus further includes (vi) a feature estimating means for estimating a feature which is to be subsequently extracted by the feature extracting means on the previously extracted feature which has been extracted by the feature extracting means or the feature being recorded in the recording means, (vii) wherein the feature extracting means estimates the next feature on the basis of the feature estimated by the feature estimating means.

In this case, because the synopsis of the next feature can be grasped based on the estimated feature, the next feature may be easily extracted so that the time required for extracting the feature may be reduced. Moreover, the data volume of the image processing apparatus may be small.

According to the second aspect of the present invention, there is provided (i) an image processing apparatus carried on a movable body, which includes (ii) an image pick-up means for continuously photographing a scene outside of the movable body to continuously form an image corresponding to the scene (iii) a feature extracting means for processing the image formed by the image pick-up means to continuously extract a predetermined feature in the scene (iv) an intermittent image getting means for intermittently getting a stationary image at a predetermined periodic interval from the image formed by the image pick-up means (v) a synthesizing means for synthesizing the feature extracted in the periodic interval by the feature extracting means and the stationary image obtained by the intermittent image getting means so as to form a whole image during the periodic interval (vi) a transmitting means for transmitting the image formed by the synthesizing means to an outer device, and (vii) a recording means for recording therein the image formed by the synthesizing means.

According to the image processing apparatus, the compressibility of the data can be elevated (improved) by intermittently compressing the image so as to record it, and further by extracting the feature data within the partial region in which the image exists and the interval region. Further, when the image is reproduced, the necessarily moving image is reconstructed from the image data and the feature data.

Therefore, even if the background scene continuously changes, the feature information such as a moving object can be extracted from the images over all the images. Further, because various feature information is obtained on the basis of the stationary image which is intermittently obtained, the amount of data may be extremely decreased so that the image processing apparatus may be simplified. Moreover, because the synthesized image or feature information can be transmitted to the outer device and recorded, the synthesized image or feature information can be utilized for driving or moving the movable body.

In the image processing apparatus according to the second aspect of the present invention, it is preferable that the intermittent image getting means changes (a) a procedure to get the stationary image, (b) compressibility of the image, (c) the periodic interval to get the image, or the like, according to kind or amount of change of the feature extracted by the feature extracting means. In this case, the amount of the image data may be further decreased so that the image processing apparatus may be further simplified.

In both of the image processing apparatuses described above, it is preferable that each apparatus includes a danger estimating means for estimating a dangerous situation which may be caused in the movable body on the basis of the feature extracted by the feature extracting means. In this case, because the dangerous situation which may be caused in the movable body can be estimated, the movable body can be safely driven or moved.

In both of the image processing apparatuses described above, the feature extracting means can process the image corresponding to the scene which moves wholly relative to the vehicle (i.e. image which relatively moves), or the image corresponding to the scene which does not move wholly relative to the vehicle (i.e. image which does not relatively move), so as to extract various features, each of the images being formed by the image pick-up means.

Hereupon, when the movable body is a vehicle (e.g. automobile) for example, the feature in the scene, which is to be extracted by the feature extracting means, may be (a) a moving object such as another vehicle or a pedestrian, (b) velocity of the center of gravity of the moving object, (c) outlines of the road and the traffic lane on which the vehicle is moving, (d) curvature radius of a winding road, (e) width of the traffic lane on which the vehicle is moving, (f) number of the traffic lanes of the road, (g) a road crossing, (h) the position of the vehicle within the road and the traffic lane on which the vehicle is moving, (i) whether both side road-indicating lines defining the road or the traffic lane, on which the vehicle is moving, are continuous lines or broken lines, (j) color of the both side road-indicating lines defining the Toad or the traffic lane, on which the vehicle is moving, (k) color of a traffic control sign, (l) shape of the traffic control sign, (m) a guide sign, (n) a signal, (o) signal color of the signal, (p) flashes of signal light of the signal, (q) a guardrail, (r) a side wall of the road, (s) a parked vehicle, (t) a traffic obstruction, (u) a barrier for a railroad crossing, or the like.

BRIEF DESCRIPTION OF THE DRAWINGS

These and other objects, features and advantages of the present invention will become clear from the following description taken in conjunction with the preferred embodiments with reference to the accompanying drawings.

DETAILED DESCRIPTION OF THE PREFERRED EMBODIMENTS

Hereinafter, preferred embodiments of the present invention will be concretely described with reference to the accompanying drawings.
(First Embodiment)

Hereinafter, the first embodiment of the present invention will be described.

Figure 1:
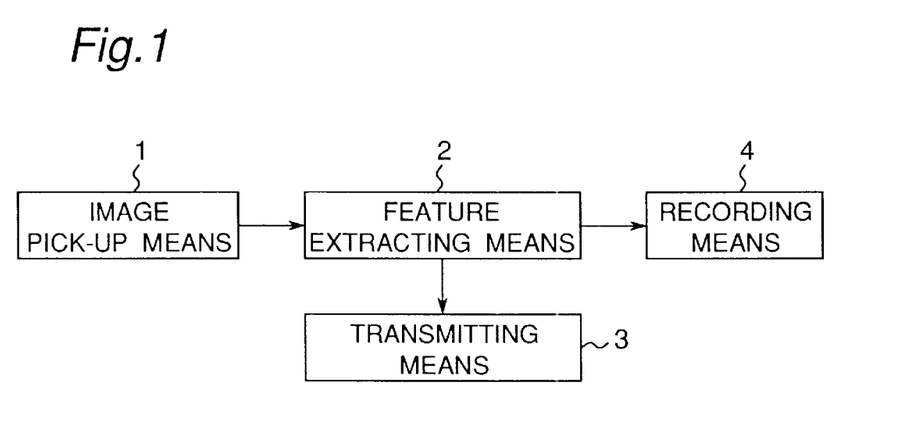
FIG. 1 is a block diagram showing the construction of an image processing apparatus according to the present invention.

FIG. 1 is a block diagram showing the construction of an image processing apparatus (on-vehicle image processing apparatus), which is carried on a vehicle, according to the first embodiment of the present invention. As shown in FIG. 1, the image processing apparatus is provided with an image pick-up means 1 for continuously photographing the scene (for example, road and its circumstance etc.) outside of the vehicle to continuously form an image (i.e. pick-up the image) corresponding to the scene, a feature extracting means 2 for processing the image formed by the image pick-up means 1 to continuously extract a predetermined feature in the scene, a transmitting means 3 for transmitting the feature (feature information) extracted by the feature extracting means 2 to an outer device, and a recording means 4 for recording the feature (feature information) extracted by the feature extracting means 2.

Figure 2:
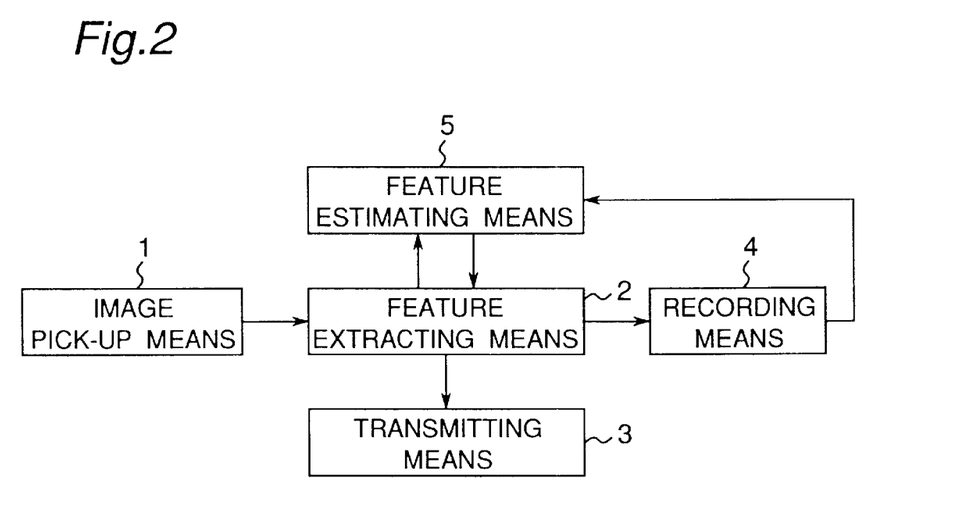
FIG. 2 is a block diagram showing the construction of another image processing apparatus according to the present invention.

Hereupon, as shown in FIG. 2, it is preferable that the image processing apparatus is provided with a feature estimating means 5 for estimating a feature which is to be extracted in the next process by the feature extracting means 2 on the basis of the feature extracted by the feature extracting means 2 or the feature recorded by the recording means 4, and further the feature extracting means 2 is adapted to extract the next feature on the basis of the feature estimated by the feature estimating means 5. In this case, because the synopsis of the next feature can Hereinafter, the procedure of the specific image processing by the image processing apparatus shown in FIG. 2 will be described according to the flowchart shown in FIG. 3.

Figure 3:
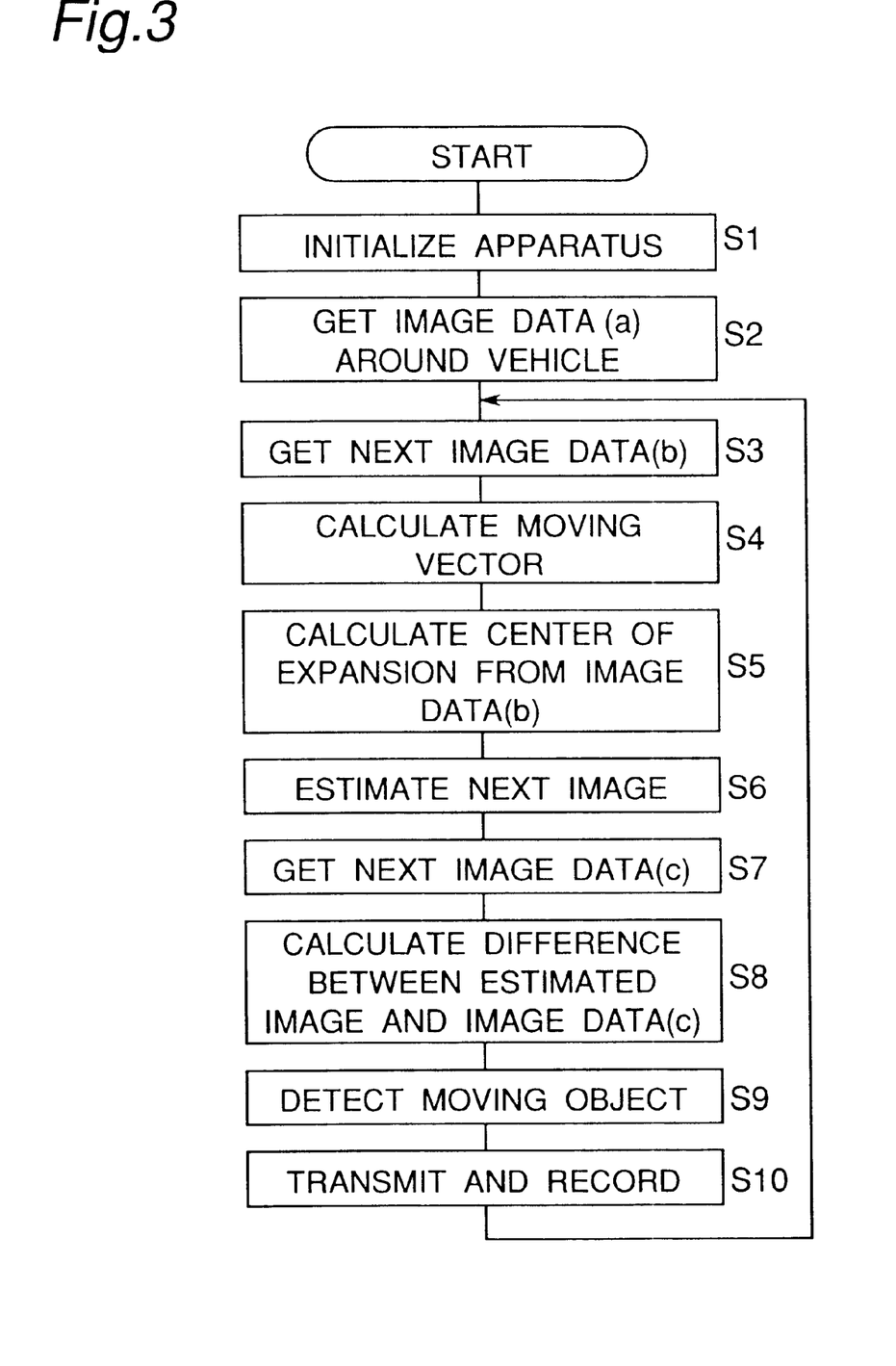
FIG. 3 is a flowchart showing the procedure of the image processing for detecting a moving object on the basis of an estimated image by the image processing apparatus according to the present invention.
Figure 4A:
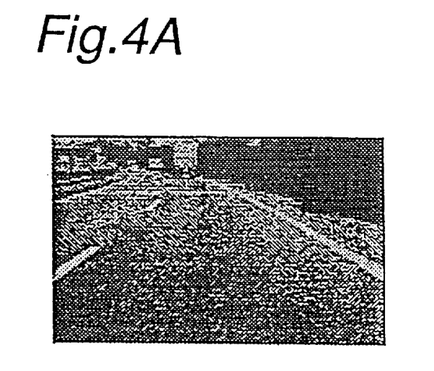
FIGS. 4A, 4B and 4C are intermediately processed images, which are photographed by the image pick-up means and then represented on the display in the image processing shown in FIG. 3, respectively.
Figure 4B:
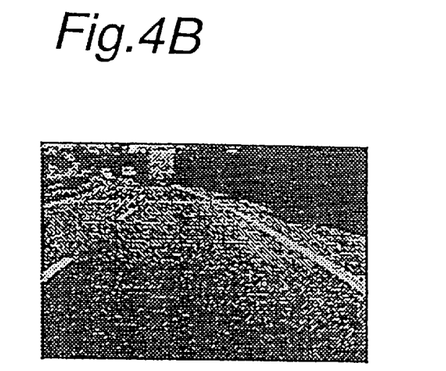

As shown in FIG. 3, in the image processing for detecting a moving object is, at first, the image processing apparatus is initialized in Step S1. Next, in Step S2, image data (a) around the vehicle as shown, for example, in FIG. 4A is obtained, and then next image data (b) as shown, for example, in FIG. 4B is obtained in Step S3.

Figure 4C:
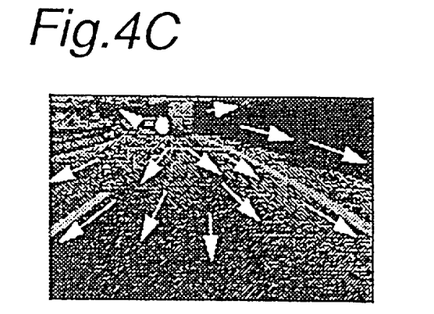

Next, moving vectors as shown, for example, in FIG. 4C are calculated on the basis of the image data (a) and the image data (b) in Step S4, and then the center of expression is calculated on the basis of the moving vectors in Step S5. Further, in Step S6, next image is estimated on the basis of the moving vectors and the center of expression.

Figure 5:
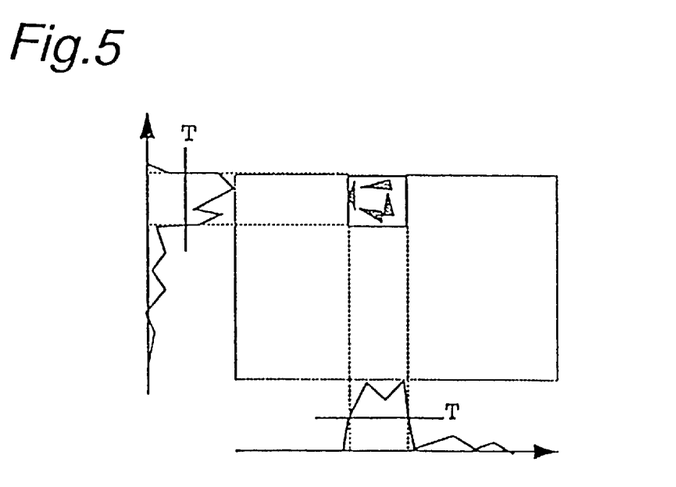
FIG. 5 is a view showing the procedure for extracting a moving object in the image.

Moreover, next image data (c) is obtained in Step S7, and then the difference between the estimated image and the image data (c) is calculated in Step S8. Hereupon, as shown, for example, in FIG. 5, the moving object is recognized or identified in the form of region above the threshold T by scanning the image in the traverse direction (horizontal direction) as well as in the longitudinal direction (vertical direction).

Further, the moving object is detected on the basis of the above-mentioned difference in Step S9, and then the feature information with respect to the moving object is transmitted to the outer device and recorded in the recording means 4 in Step S10.

Then, the procedure is sent back to Step S3, and further Steps S3 to S10 are repeatedly performed so that the moving object is continuously detected.
(Second Embodiment)

Hereinafter, the second embodiment of the present invention will be described. Hereupon, in the image processing apparatus according to the second embodiment, its hardware construction is as same as that of the image processing apparatus according to the first embodiment shown in FIG. 1 or 2, and merely image processing methods of the both differ from each other. Therefore, in order to avoid duplicate descriptions, the description about the hardware construction of the image processing apparatus is abbreviated, and hereinafter only the procedure of the image processing will be described.

Figure 6:
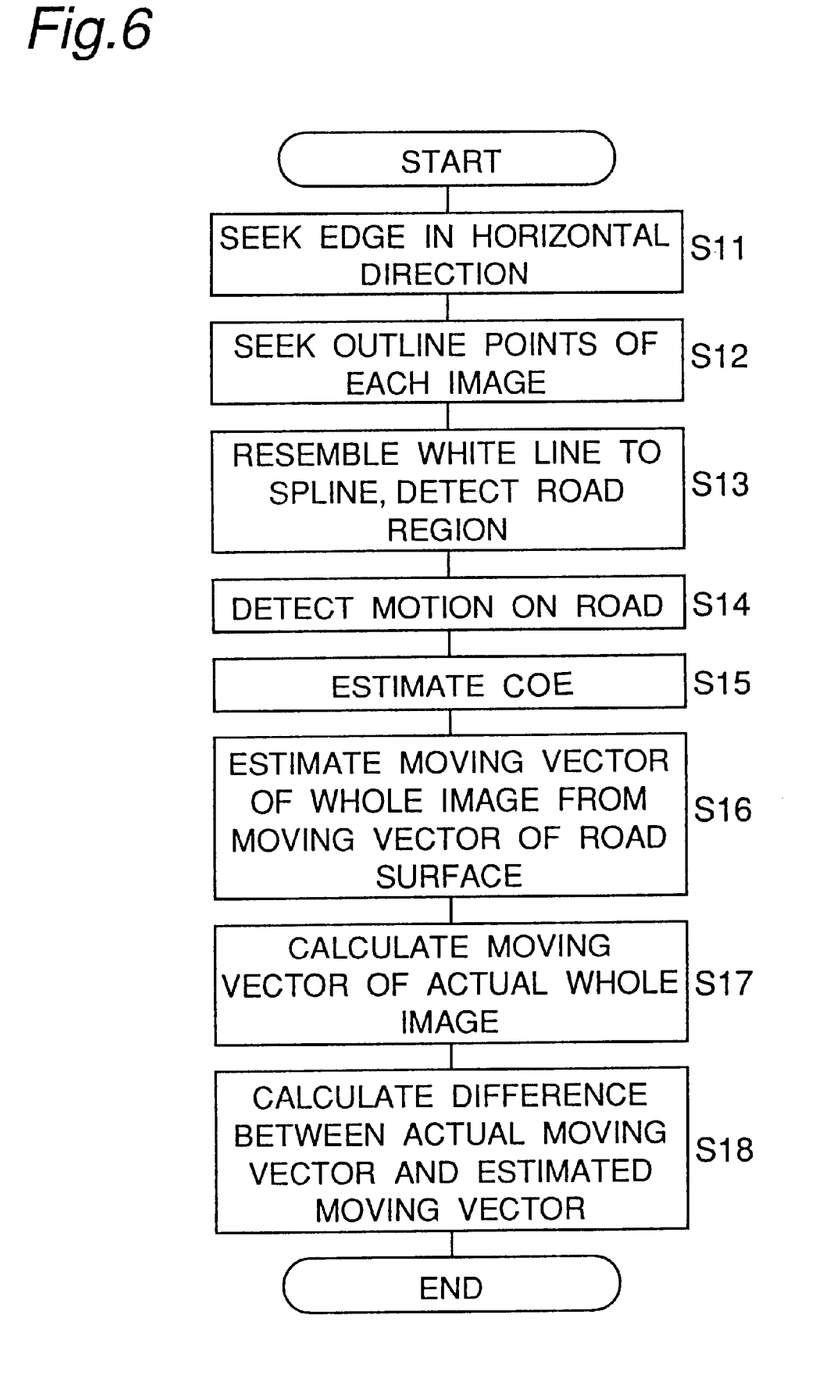
FIG. 6 is a flowchart showing the procedure of the image processing by the image processing apparatus according to the present invention.
Figure 7A:
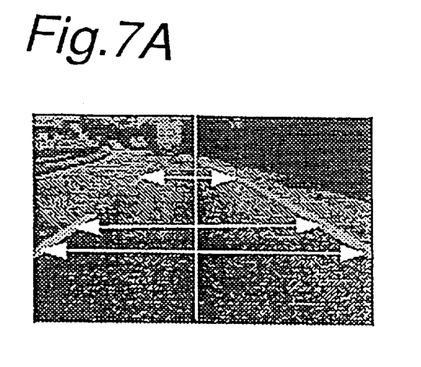
FIGS. 7A and 7B are intermediately processed images, which are photographed by the image pick-up means and then represented on the display in the image processing shown in FIG. 6, respectively.
Figure 7B:
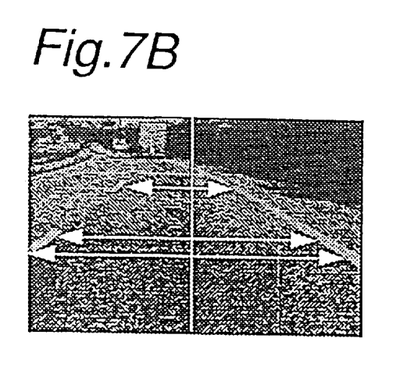
Figure 8A:
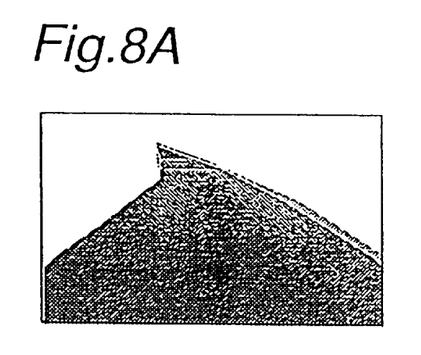
FIGS. 8A and 8B are intermediately processed images, which are represented on the display after the image processing for seeking outline points with respect to the image shown in FIG. 7 has been performed, respectively.
Figure 8B:
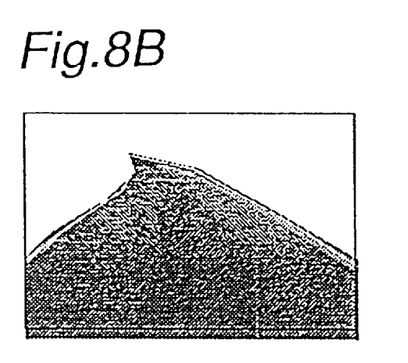

As shown in FIG. 6, in the image processing according to the second embodiment, at first, two successive images are scanned in the horizontal direction as shown, for example, in FIGS. 7A and 7B so that edges, namely partial image corresponding to white lines on the road, are sought in Step S11. Following this, in Step S12, a plurality of (many) outline points are sought with respect to each of the images, as shown, for example, in FIGS. 8A and 8B.

Figure 9:
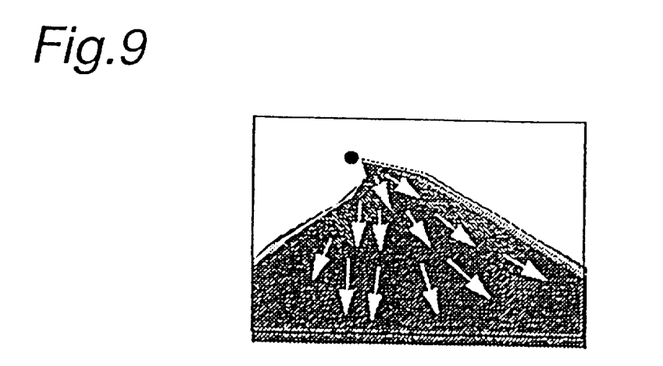
FIG. 9 is an intermediately processed image, which is represented on the display under the condition that the FOE is estimated after the image has been photographed by the image pick-up means in the image processing shown in FIG. 6.

Next, in Step S13, the white lines on the road are resembled by splines which fit the outline points, and then the road region is detected. Further, in Step S14, the motion on the road is detected as shown, for example, in FIG. 9, and then the COE (center of expression) is estimated in Step S15.

Moreover, moving vectors of the whole image is estimated from the moving vectors of the road surface in Step S16, and then actual moving vectors of the whole image are calculated in Step S17. Next, in Step S18, the differences between the actual moving vectors and the estimated moving vectors are calculated. Then, the moving object is detected and further the detected result is transmitted and recorded in the basis of the above-mentioned differences as same as the case described in Steps S9 to S10 shown in FIG. 3, although the detailed procedure is not shown in the figure.
(Third Embodiment)

Hereinafter, the third embodiment of the present invention will be described.

Figure 10:
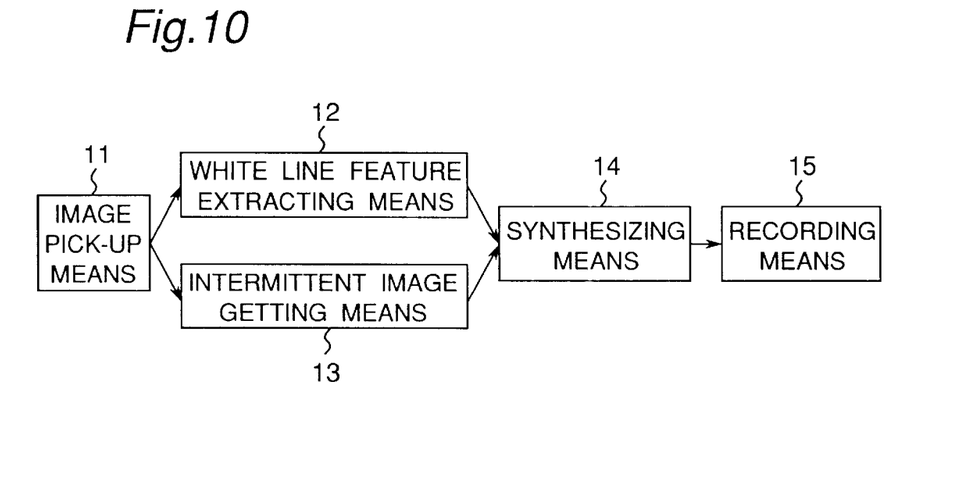
FIG. 10 is a block diagram showing the construction of an image processing apparatus according to the present invention, for extracting features such as a white line on the road.
Figure 11:
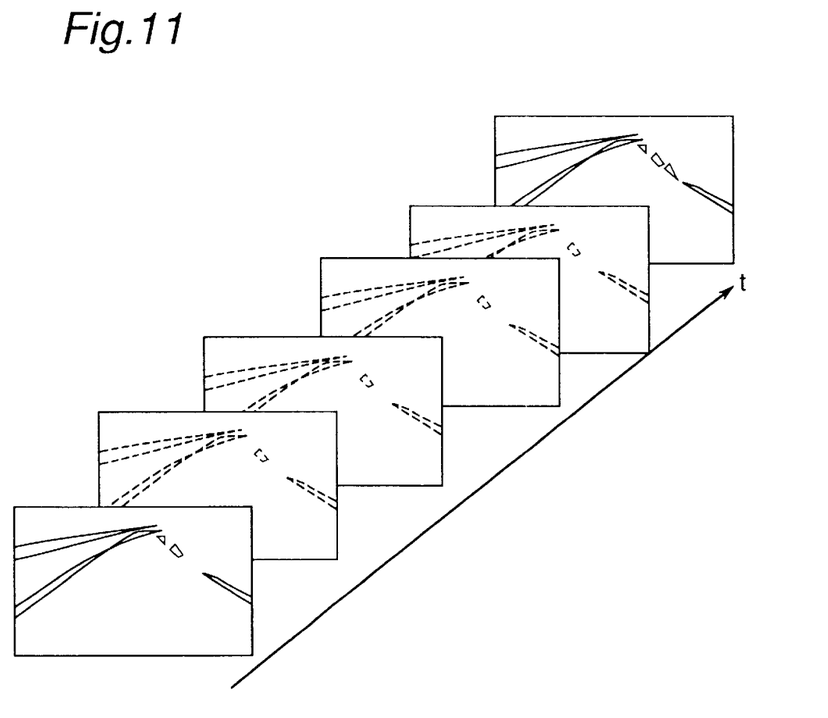
FIG. 11 is a view showing an example of the procedure for collecting data with respect to a white line and guardrail in the image processing by the image processing apparatus shown in FIG. 10.

FIG. 10 is a view showing the construction of an image processing apparatus, which is carried on a vehicle, according to the third embodiment of the present invention. As shown in FIG. 10, the image processing apparatus is provided with an image pick-up means 11 for continuously photographing the scene outside of the vehicle to continuously form an image corresponding to the scene, a white line feature extracting means 12 for processing the image formed by the image pick-up means 11 to detect a white line(s) on the road, an intermittent image getting means 13 for obtaining intermittently stationary images with a predetermined periodical interval from the image formed by the image pick-up means 11, a synthesizing means 14 for synthesizing the feature extracted during the periodical interval by the white line feature extracting means 12 and the stationary image obtained by the intermittent image getting means 13 to form the whole image in the interval, and a recording means 15 for recording the image formed by the synthesizing means 14.

Hereinafter, the action or procedure of the image processing in the image processing apparatus shown in FIG. 10 will be described.

In the image processing, at first, the image around the vehicle from the image pick-up means 11 is inputted into the white line feature extracting means 12.

Moreover, the image around the vehicle from the image pick-up means 11 is inputted into the intermittent image getting means 13. Thus, in the intermittent image getting means 13, images from the image pick-up means 11 are intermittently obtained with a constant periodic interval, and then the above-mentioned images are compressed using the JPEG (Joint Photographic Expert Group) compression method. In the synthesizing means 14, the feature data from the white line feature extracting means 12 and the image data from the intermittent image getting means 13 are aligned in order of time. Further, in the recording means 15, the image data and feature data aligned in order of time are recorded or conserved within a given constant period.

Hereinafter, with reference to the flowchart shown in FIG. 12, there will be described the specific procedure for generating data about the white line on the road and the guardrail, the procedure being contained in the image processing flow described above.

Figure 12:
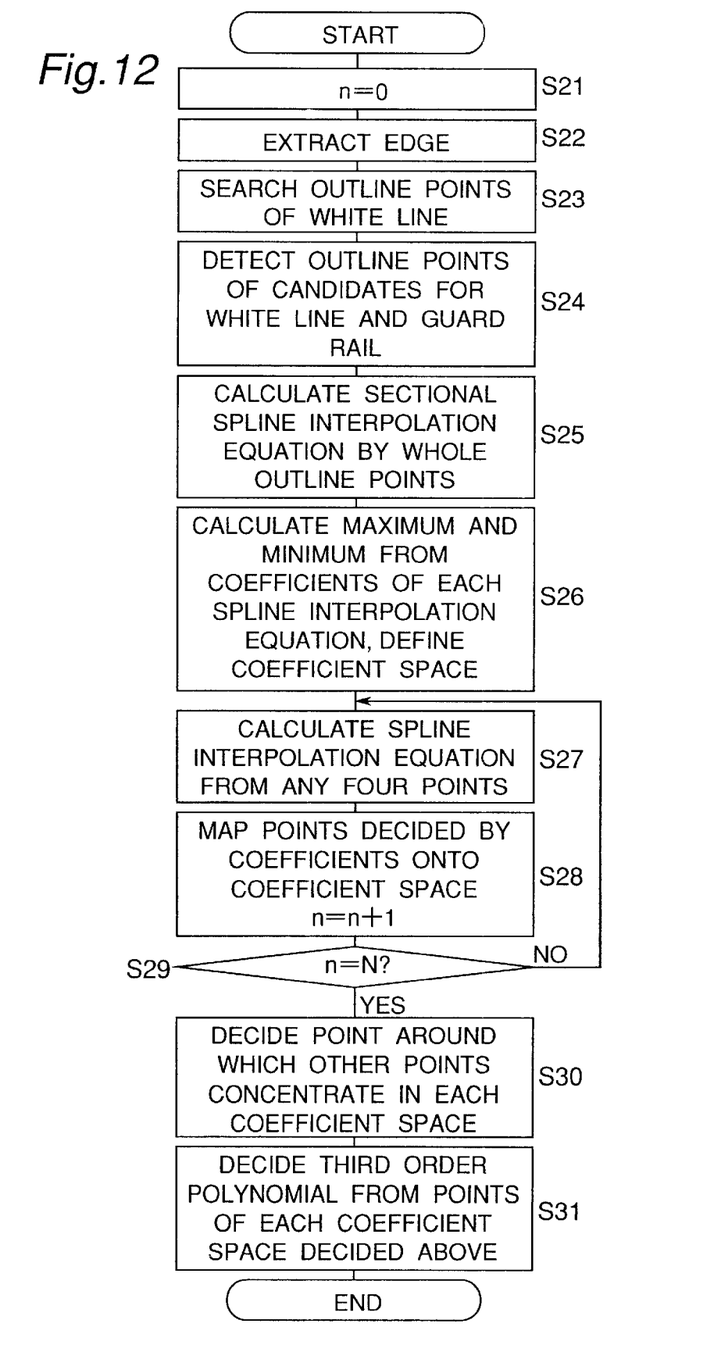
FIG. 12 is a flowchart showing the procedure of the image processing by the image processing apparatus shown in FIG. 10.

As shown in FIG. 12, in the procedure for generating the data, at first, initialization is performed while setting the counter n at zero in Step S21. Following this, in Step S22, edges of the image around the vehicle are detected. Further, in Step S23, the image is scanned in the left-right direction from the center of the edge image, upward from the bottom of the image, so that there is searched a white line outline point which exceeds a predetermined threshold for the first time.

Next, in Step S24, the outline point which is closest to the center of each of the scanning lines is detected as a candidate outline point of the left and right white lines on the road, and further the outline point which exists outside of the white line on the road is detected as a candidate outline point of the guardrail. Following this, in Step S25, four dimensional spaces are supposed as to the left and right white lines and the left and right guardrails, respectively, and then a third order equation is calculated in each section as a spline interpolation equation using the candidate outline point of the white line and the candidate outline point of the guardrail.

Further, in Step S26, the space defined in Step S25 is limited on the basis of the maximum value and the minimum value in each of coefficients of the third order equation. Following this, in Step S27, four arbitrary points are extracted from the outline points of each of the left and right ones so as to calculate a third order spline interpolation equation. Moreover, in Step S28, the points, which are decided from the coefficients of the calculated third polynomial, are mapped on the four dimensional space defined previously, while adding 1 to the counter n (n=n+1). Further, the procedure from Step S27 to Step S29 is repeated, until the counter n reaches a predetermined value N in Step S29 (i.e. it is repeated for N times). Then, in Step S30, the points around which other points concentrate in each coefficient space, and further each coefficient of the third order polynomial is decided from the points decided above in Step S31.

As described above, in the image processing apparatus according to the third embodiment of the present invention, because the image data is intermittently recorded so that there are recorded values measured on the image of the white line on the road and the guardrail in the interval portion, information around the vehicle can be recorded with only an extremely small amount of data.

(Fourth embodiment)

Hereinafter, the fourth embodiment of the present invention will be described.

Figure 13:
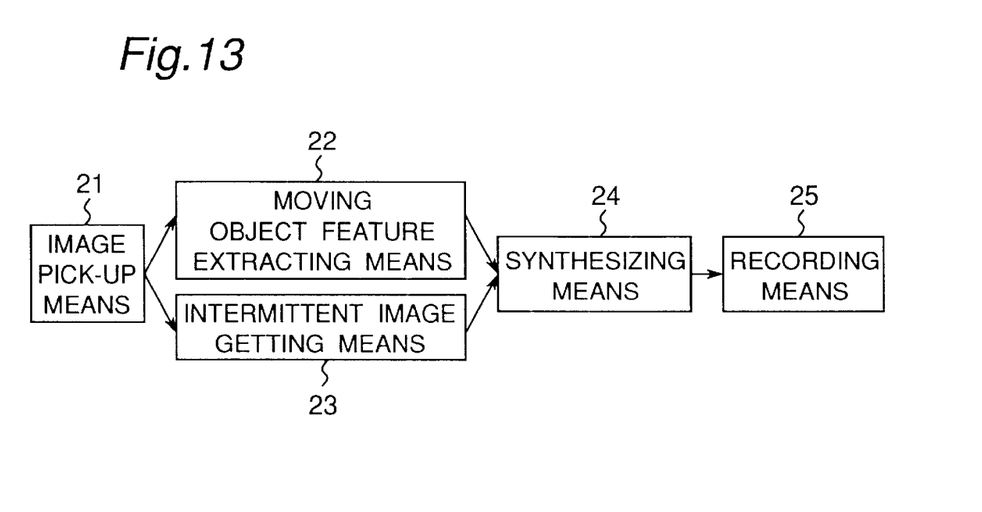
FIG. 13 is a block diagram showing the construction of an image processing apparatus according to the present invention, for extracting features of the moving object.

FIG. 13 is a block diagram showing the construction of an image processing apparatus, which is carried on a vehicle, according to the fourth embodiment of the present invention. As shown in FIG. 13, the image processing apparatus is provided with an image pick-up means 21 for continuously photographing the scene outside of the vehicle to continuously form image corresponding to the scene, a moving object feature extracting means 22 for processing the image formed by the image pick-up means 21 to detect a feature of the moving object, an intermittent image getting means 23 for obtaining intermittently stationary images with a predetermined periodical interval from the image formed by the image pick-up means 21, a synthesizing means 24 for synthesizing the feature extracted during the interval by the moving object feature extracting means 22 and the stationary image obtained by intermittent image getting means 23 to form the whole image in the interval, and a recording means 25 for recording the formed by the synthesizing means 24.

Hereinafter, the action or procedure of the image processing in the image processing apparatus shown in FIG. 13 will be described.

In the image processing, at first, image around the vehicle from the image pick-up means 21 is inputted into the moving object feature extracting means 22.

Figure 14:
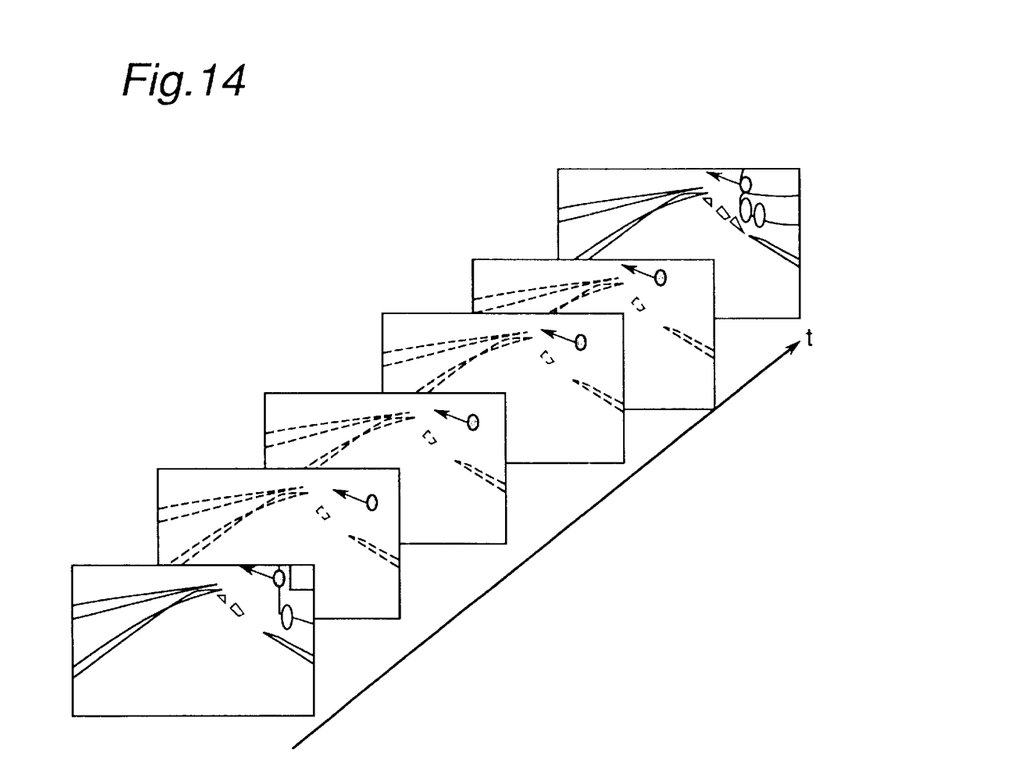
FIG. 14 is a view showing an example of the procedure for collecting data with respect to a moving object in the image processing by the image processing apparatus shown in FIG. 13.

Further, as shown in FIG. 14, in the moving object feature extracting means 22, the moving object in the image is extracted, and then the center of gravity and the moving vector in the image are sought.

Moreover, the image around the vehicle from the image pick-up means 21 is inputted into the intermittent image getting means 23. Thus, in the intermittent image getting means 23, the images from the image pick-up means 21 are intermittently obtained with a constant periodic interval, and then the above-mentioned images are compressed using the JPEG compression method. Further, in the synthesizing means 24, the feature data from the moving object feature extracting means 22 and the image data from the intermittent image getting means 23 are aligned in order of time. Moreover, in the recording means 25, the image data and feature data aligned in order of time are recorded or conserved within a given constant period.

Hereinafter, with reference to the flowchart shown in FIG. 15, there will be described the specific procedure for generating feature data of the moving object, the procedure being contained in the image processing flow described above.

Figure 15:
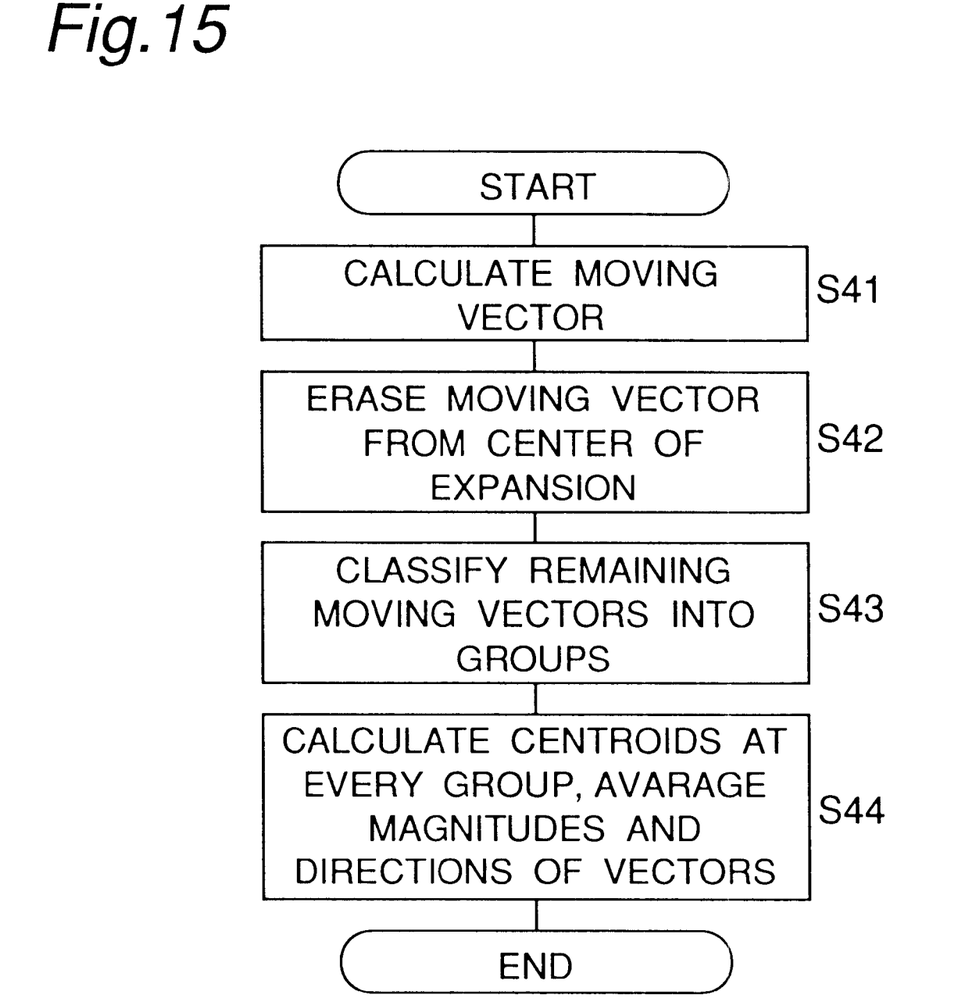
FIG. 15 is a flowchart showing the procedure of the image processing by the image processing apparatus shown in FIG. 13.

As shown in FIG. 15, in the procedure for generating the data, at first, the moving vectors are calculated with respect to the whole image in step S41. Following this, in Step S42, the moving vectors from the center of expansion are erased (removed). Further, in Step S43, remaining moving vectors are classified into groups at every direction. Then, in Step S44, the center of gravity is calculated at every group, and further the magnitude and direction of the vectors are averaged. Namely, the center of gravity of each of the regions classified into groups is sought, the average magnitude and average direction of the vectors in the region are calculated, and then the center of gravity is defined as a representative point of the moving object.

As described above, in the image processing apparatus according to the fourth embodiment of the present invention, because the image data is intermittently recorded so that there are recorded values of the center of gravity of the moving object measured on the image in the interval portion, information around the vehicle can be recorded with only an extremely small amount of data.

As apparent from the above description, in the image processing apparatus according to the present invention, accurate data of the status of the road can be recorded using a memory of small capacity.

As described above, the present invention has been described in detail in terms of preferred embodiments. However, it will be apparent to those skilled in the art that the present invention is not limited by the embodiments, and consequently numerous variations and modifications may be made within the scope of the invention, as set forth in the following claims.

What is claimed is:

1. An image processing apparatus to be carried on a movable body, said apparatus comprising:

an image pick-up means for continuously photographing a scene outside of the movable body to continuously form an image corresponding to the scene;

a feature extracting means for processing the image formed by the image pick-up means to continuously extract a predetermined feature in the scene by seeking outline points of the image and then detecting the outline points as a polynomial;

an intermittent image getting means for intermittently getting a stationary image at a predetermined periodic interval from the image formed by the image pick-up means;

a synthesizing means for synthesizing the feature extracted in the periodic interval by the feature extracting means and the stationary image obtained by the intermittent image getting means so as to form a whole image during the periodic interval;

a transmitting means for transmitting the image formed by the synthesizing means to an external device; and a recording means for recording therein the image formed by the synthesizing means.

2. The image processing apparatus according to claim 1, wherein the intermittent image getting means is operable to change a procedure to obtain the stationary image, according to a change of the feature extracted by the feature extracting means.

3. The image processing apparatus according to claim 1, wherein the intermittent image getting means is operable to change compressibility of the image, according to a change of the feature extracted by the feature extracting means.

4. The image processing apparatus according to claim 1, wherein the movable body is a vehicle.

5. The image processing apparatus according to claim 1, wherein the intermittent image getting means is operable to change the periodic interval to get the image, according to a change of the feature extracted by the feature extracting means.

6. The image processing apparatus according to claim 5, further comprising a danger estimating means for estimating a dangerous affair which may be caused in the movable body based on the feature extracted by the feature extracting means.

7. The image processing apparatus according to claim 6, wherein the movable body is a vehicle.

8. The image processing apparatus according to claim 1, wherein the movable body is a vehicle.

9. The image processing apparatus according to claim 8, wherein the feature extracting means is operable to process the image, which is formed by the image pick-up means, corresponding to the scene which moves wholly relative to the vehicle so as to extract a moving object in the scene as the above-mentioned feature.

10. The image processing apparatus according to claim 8, wherein the feature extracting means is operable to process the image, which is formed by the image pick-up means, corresponding to the scene which does not move wholly relative to the vehicle so as to extract a moving object in the scene as the above-mentioned feature.

11. The image processing apparatus according to claim 8, wherein the feature extracting means is operable to process the image, which is formed by the image pick-up means, corresponding to the scene which moves wholly relative to the vehicle so as to extract velocity of the center of gravity of a moving object in the scene as the above-mentioned feature.

12. The image processing apparatus according to claim 8, wherein the feature extracting means is operable to process the image, which is formed by the image pick-up means, corresponding to the scene which does not move wholly relative to the vehicle so as to extract velocity of the center of gravity of a moving object in the scene as the above-mentioned feature.

13. The image processing apparatus according to claim 8, wherein the feature extracting means is operable to extract outlines of a road in the scene and a traffic lane, on which the vehicle is moving, in the scene as the above-mentioned feature.

14. The image processing apparatus according to claim 8, wherein the feature extracting means is operable to extract a guardrail in the scene as the above-mentioned feature.

* * * * *

UNITED STATES PATENT AND TRADEMARK OFFICE
CERTIFICATE OF CORRECTION

PATENT NO. : 6,731,332 B1
DATED : May 4, 2004
INVENTOR(S) : Nobuhiko Yasui et al.

It is certified that error appears in the above-identified patent and that said Letters Patent is hereby corrected as shown below:

<u>Title page,</u>
Item [57], ABSTRACT,
Line 11, insert -- a -- after "using".

Signed and Sealed this

Fourth Day of January, 2005

JON W. DUDAS
*Director of the United States Patent and Trademark Office*